United States Patent
Schaller et al.

(10) Patent No.: US 6,595,522 B2
(45) Date of Patent: Jul. 22, 2003

(54) VEHICLE SEAT COVERING SYSTEM

(75) Inventors: Bernard W Schaller, Flat Rock, MI (US); Todd Grubbs, Adrian, MI (US); George A Corder, Romulus, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/975,693

(22) Filed: Oct. 11, 2001

(65) Prior Publication Data

US 2003/0071479 A1 Apr. 17, 2003

(51) Int. Cl.[7] .......................... B60J 7/047; B60J 7/053; B60J 7/057; B60J 7/20
(52) U.S. Cl. .......................... 276/220.01; 296/107.17; 296/107.2; 296/222; 296/216.04; 296/63
(58) Field of Search .......................... 296/136, 107.17, 296/107.18, 107.19, 107.2, 216.01, 220.01, 222, 216.04, 63, 85

(56) References Cited

U.S. PATENT DOCUMENTS

| | | | | |
|---|---|---|---|---|
| 2,057,907 A | * | 10/1936 | Nasarevich | 296/136 |
| 2,959,447 A | * | 11/1960 | Stebbins et al. | 296/136 |
| 3,154,341 A | * | 10/1964 | Booth | 296/136 |
| 3,172,695 A | * | 3/1965 | Bordinat, Jr. | 296/136 |
| 3,536,354 A | | 10/1970 | Ingram | |
| 4,687,247 A | * | 8/1987 | Muscat | 296/136 |
| 4,799,729 A | * | 1/1989 | Muscat | 296/136 |
| 4,890,876 A | * | 1/1990 | Gaines | 296/136 |
| 5,056,857 A | * | 10/1991 | Ney et al. | 296/216.01 |
| 5,195,798 A | * | 3/1993 | Klein et al. | 296/107.17 |
| 5,211,718 A | * | 5/1993 | Gotz et al. | 296/136 |
| 5,429,409 A | | 7/1995 | Corder et al. | |
| 5,542,735 A | * | 8/1996 | Furst et al. | 296/107.18 |
| 5,743,587 A | | 4/1998 | Alexander et al. | |
| 5,765,905 A | * | 6/1998 | Hemmis et al. | 296/136 |
| 5,785,375 A | | 7/1998 | Alexander et al. | |
| 5,810,422 A | | 9/1998 | Corder et al. | |
| 5,967,593 A | * | 10/1999 | Schuler et al. | 296/107.08 |
| 5,979,970 A | * | 11/1999 | Rothe et al. | 296/107.17 |
| 6,033,012 A | * | 3/2000 | Russke et al. | 296/107.17 |
| 6,053,560 A | * | 4/2000 | Rothe | 296/107.17 |
| 6,312,042 B1 | * | 11/2001 | Halbweiss et al. | 296/107.17 |
| 6,318,792 B1 | * | 11/2001 | Neubrand et al. | 296/107.08 |
| 6,347,828 B1 | * | 2/2002 | Rapin et al. | 296/107.17 |
| 6,386,615 B2 | * | 5/2002 | Neubrand et al. | 296/136 |
| 2003/0042751 A1 | * | 3/2003 | Antreich | 296/107.17 |

OTHER PUBLICATIONS

Bennett, James, "The Road to a Roadster" The Buick Bengal is not yet a car you can buy, but it is a beauty—one more example of Detroit'rediscovery of the romance of design., The New York Times Magazine, Feb. 18, 2001, pp. 32–37.
Kranz, Rick, "GM approves Buick ragtop", Crain Automotive News, Jul. 9, 2001, pp. 1 and 41.
Advertisement "Making these cars a reality. Now that's a concept." Detroit Free Press, Jan. 14, 2001, p. 3L.
Oosrhuizen, Hannes, "Buick gets sexy", http://www.galimoto.co.za/wwbuickbengal.htm, Copyright, Galimoto Media, 2000.
Bonsall, Thomas, "Ride&Drive's Industry Update" For the week of Nov. 5–11, 2000, www.rideanddrive.com, pp. 1–13.
Hanson, Holly, "The Insider Look at the Auto Show Charity Preview" Saturday in the Free Press, Detroit Free Press, date and page unknown.

\* cited by examiner

Primary Examiner—D. Glenn Dayoan
Assistant Examiner—H. Gutman
(74) Attorney, Agent, or Firm—Harness, Dickey & Pierce, P.L.C.

(57) ABSTRACT

A covering system for a rear passenger seat of an automotive vehicle includes a panel that is positionable in an extended position that generally conceals the rear passenger seat and a retracted position that generally reveals the passenger seat. The covering system further includes an automatic drive system capable of driving the panel between the extended position and the retracted position. The covering system of the present invention enables a four-seat convertible vehicle to be quickly and conveniently converted into a two-seat roadster-style vehicle.

37 Claims, 9 Drawing Sheets

100
VEHICLE SEAT COVERING SYSTEM

FIELD OF THE INVENTION

The present invention generally relates to convertible automotive vehicles and, more particularly, relates to convertible automotive vehicles having a retractable body panel that selectively reveals a rear seat of the automotive vehicle in order to convert the automotive vehicle between a roadster and a four-seater.

BACKGROUND & SUMMARY OF THE INVENTION

Convertible automotive vehicles commonly employ a soft top or hard top roof that is positionable in a fully raised position, which covers the passenger compartment, and a lowered and retracted position in which the top is stowed behind a rear seat, in a boot well, or in the trunk of the vehicle. Generally, these soft top or hard top roofs are retracted using a multi-linkage mechanism. These multi-linkage mechanisms are often manually operable or driven by a hydraulic or electric motor actuator.

Recently however, roadster-style vehicles have become increasingly popular due to their sporty styling and open cockpits. However, roadsters by definition include only two passenger seats and typically a very small trunk area. Such a configuration may add to the sporty image of the vehicle, but reduces the practicality of the vehicle. Therefore, roadster-style vehicles are generally used for around town trips or short cross-country trips with no more than two passengers. Thus, these roadster-style vehicles are generally only owned by single individuals or young couples with no children.

On the other hand, it is well known to provide convertible four-seater automobiles. These convertible four-seater automobiles provide additional seating for passengers, while retaining the convertible function. Although this added functionality appeals to some due to the added seating capability, these convertible four-seaters may not provide the same attraction to those single individuals or young couples as a roadster.

Accordingly, there exists a need in the art to provide a convertible automotive vehicle capable of accommodating four passengers without sacrificing the aesthetic appeal of a roadster-styled vehicle. Furthermore, there exists a need in the relevant art to provide a convertible automotive vehicle capable of converting between a four-seater configuration and a roadster-style configuration. Still further, there exists a need in the relevant art to provide a convertible system capable of selectively revealing a rear seat of a vehicle so as to convert the vehicle between the four-seater configuration and the roadster-style configuration. Additionally, there exists a need in the relevant art to provide a convertible automotive vehicle capable of overcoming the disadvantages of the prior art.

According to the principles of the present invention, a covering system for a rear passenger seat of an automotive vehicle is provided having an advantageous construction. The covering system includes a panel that is positionable in an extended position that generally conceals the rear passenger seat and a retracted position that generally reveals the passenger seat. The covering system further includes an automatic drive system capable of driving the panel between the extended position and the retracted position. The covering system of the present invention enables a four-seat convertible vehicle to be quickly and conveniently converted into a two-seat roadster-style vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is a partial cross sectional view illustrating the outboard cam pin arrangement.

DETAILED DESCRIPTION OF THE PREFERRED EMBODIMENT

The following description of the preferred embodiment is merely exemplary in nature and is in no way intended to limit the invention, its application, or uses.

Figure 1:
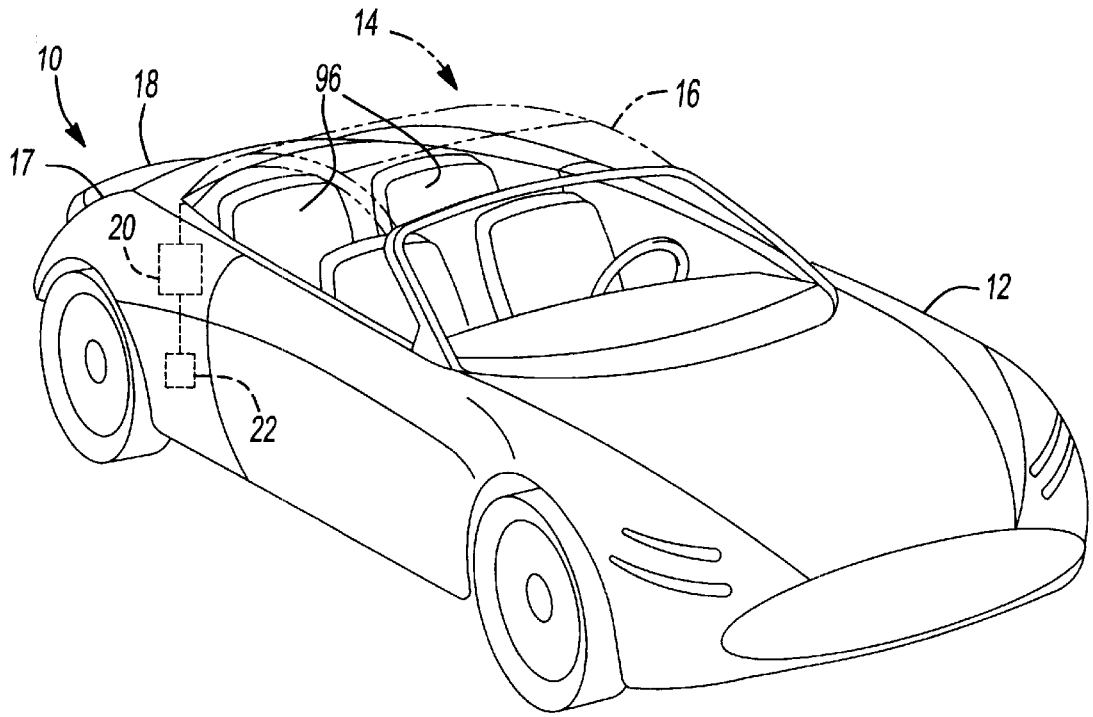
FIG. 1 is a perspective view illustrating a motor vehicle incorporating a vehicle seat covering system according to the principles of the present invention having the vehicle seat covering system in a retracted and revealing position.
Figure 2:
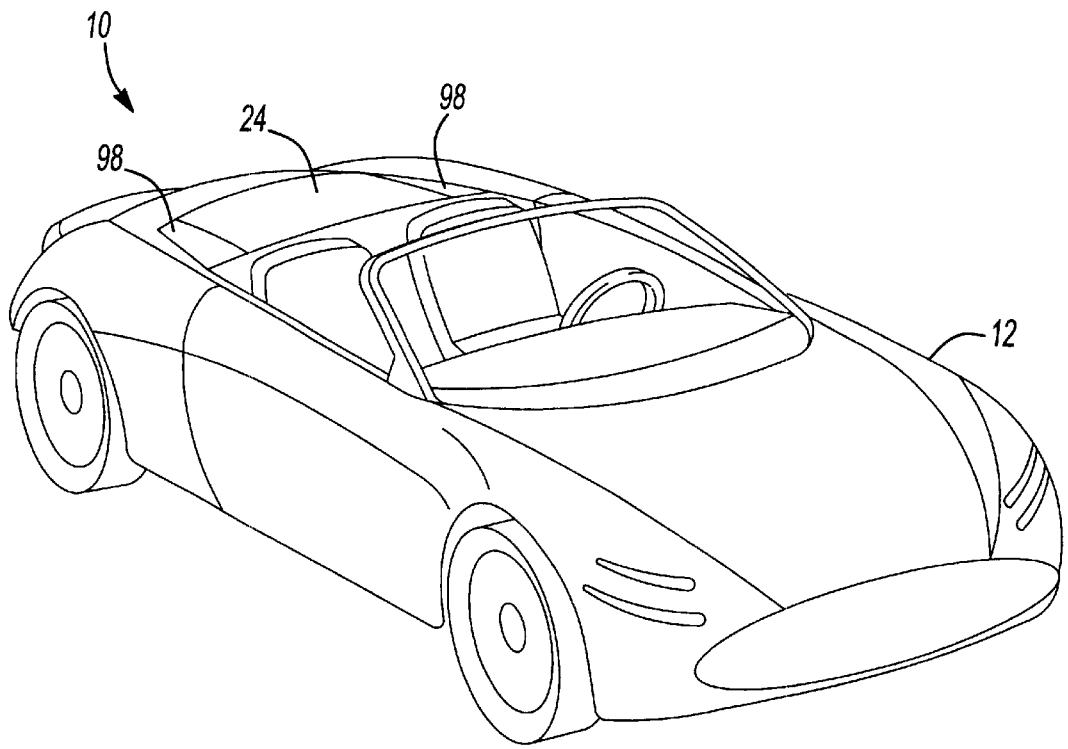
FIG. 2 is a perspective view illustrating the motor vehicle incorporating the vehicle seat covering system according to the principles of the present invention having the vehicle seat covering system in an extended and concealing position.
Figure 3:
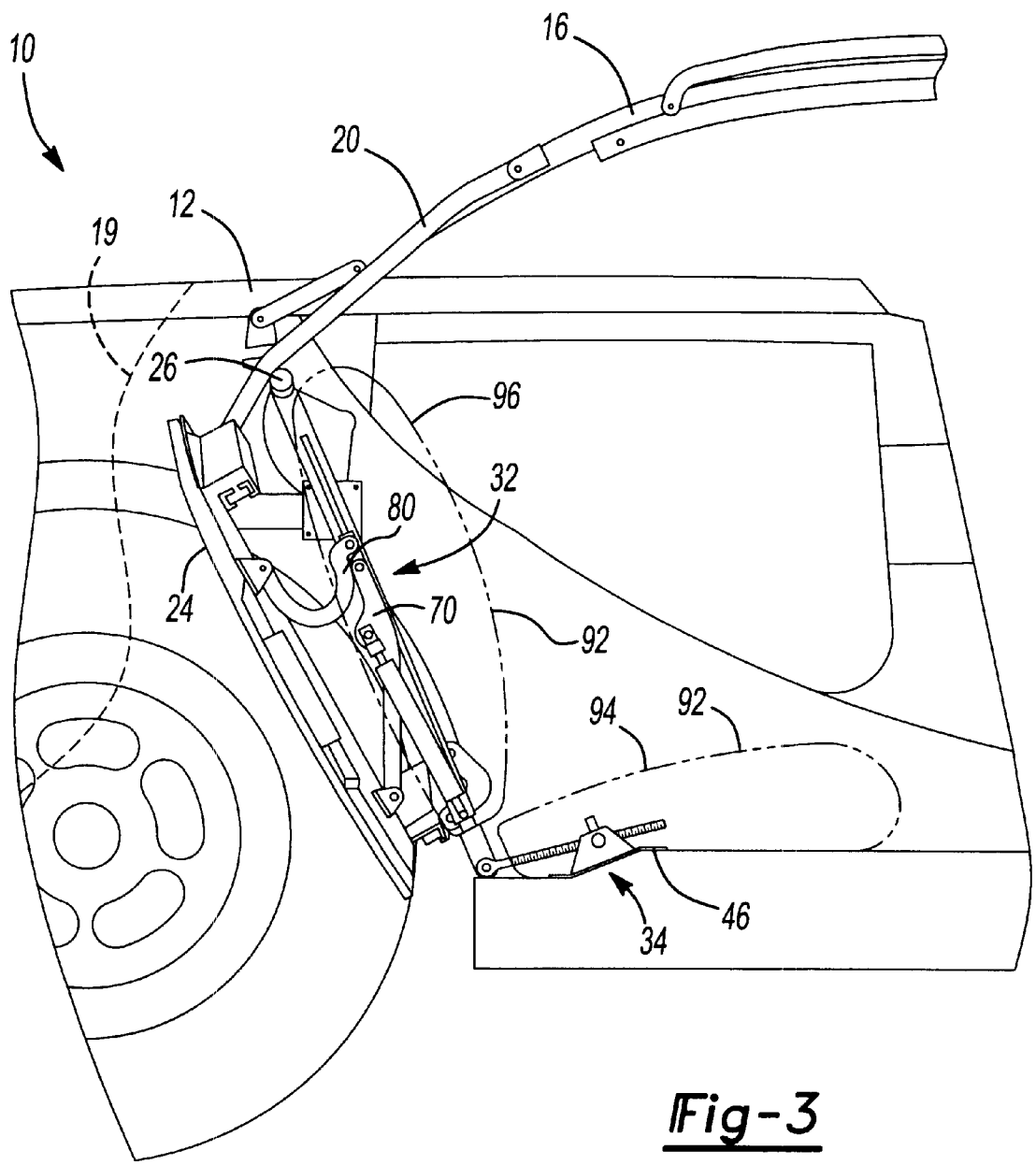
FIG. 3 is a partial cross-sectional view illustrating the vehicle seat covering system in a fully retracted and stowed position and the convertible roof in a fully extended position.

Referring to the drawings, a rear seat body panel assembly, generally indicated at 10, is provided for use in an automotive vehicle 12 according to the principles of the present invention. As best seen in FIGS. 1–3, automotive vehicle 12 includes a convertible top mechanism 14 having a soft top 16, a trunk lid acting as a tonneau cover 18 that covers a trunk 17, a top stack mechanism 20, and a top stack drive motor 22. In operation, top stack mechanism 20 and top stack drive motor 22 together are capable of positioning soft top 16 between a raised position and a fully retracted and stowed position. During actuation of convertible top mechanism 14, namely soft top 16, top stack mechanism 20, and top stack drive motor 22, tonneau cover 18 is actuated to selectively reveal a storage compartment 19 (FIG. 3) for soft top 16. According to a preferred embodiment, rear seat body panel assembly 10 is actuatable when convertible top mechanism 14 is in the fully retracted and stowed position or in the fully raised position. However, it should be noted that variations may exist between the preferred embodiment described herein and various alternative embodiments. For example, convertible top mechanism 14 may include a hard top configuration rather than the soft roof panel, which is illustrated. Moreover, rear seat body panel assembly 10 may be actuatable only when convertible top mechanism 14 is in a fully retracted and stowed position. Still further, it is anticipated that convertible top mechanism 14 and rear seat body panel assembly 10 may be actuated simultaneously depending upon the specific automobile configuration.

As best seen in FIGS. 3–7, rear seat body panel assembly 10 includes a body panel 24, a support frame 26, a first stage cylinder 28, a second stage cylinder 30, a four-bar linkage 32, a drive mechanism 34, and a pair of outboard covering panel assemblies 36.

Still referring to FIGS. 3–7, support frame 26 is preferably a tubular member having a box-like shape. However, the specific shape of support frame 26 is dictated by the overall construction and configuration of automotive vehicle 12. Therefore, it should be readily appreciated to one skilled in the art that the specific dimensions and configurations of the items illustrated in the figures will vary from vehicle to vehicle. Support frame 26 is adapted to carry and support first stage cylinder 28, four-bar linkage 32, and the pair of outboard covering panel assemblies 36. Support frame 26 includes a lower support member 38, an upper support member 40, and an interconnecting support member 42 disposed between lower support member 38 and upper support member 40. Support frame 26 further includes an offset drive arm 44 extending from an end of lower support member 38. Offset drive arm 44 is coaxial to yet offset from lower support member 38 50 as to serve as a moment arm for introducing a force capable of rotating support frame 26 about an axis A—A.

To this end, drive mechanism 34 generally includes a mounting bracket 46 that is fixedly coupled to the frame or support structure of automotive vehicle 12. Drive mechanism 34 further includes a screw drive member 48, that is pivotally coupled to a drive arm 50 orthogonally extending from offset drive arm 44. Screw drive member 48 is received within a stationary coupling member 52. Stationary coupling member 52 includes an internal rotating member that rotates in response to a drive motor 54 and serves to retract screw drive member 48 relative to stationary coupling member 52. This movement causes a force to be exerted upon drive arm 50 of support frame 26, thereby rotating support frame 26 about axis A—A.

As best seen in FIGS. 4–7, first stage cylinder 28 and second stage cylinder 30 are provided for actuating body panel 24 between a retracted and stowed position and a fully raised position. First stage cylinder 28 is coupled at a lower end 56 to an elongated guide channel 58. Guide channel 58 is fixedly coupled between lower support member 38 and upper support member 40 of support frame 26. Guide channel 58 is preferably a C-shaped channel capable of receiving a slide therein. Lower end 56 of first stage cylinder 28 may be coupled to lower support member 38 of support frame 26, if preferred. Alternatively, lower end 56 of first stage cylinder 28 may be coupled to a support structure of vehicle 12. An upper end 60 of first stage cylinder 28 is coupled through the back side of guide channel 58 to a slide 62. Slide 62 is slidably disposed within guide channel 58 and is movable relative to guide channel 58 upon actuation of first stage cylinder 28. That is, as first stage cylinder 28 extends, slide 62 will slide upward within guide channel 58 to facilitate the raising of body panel 24, second stage cylinder 30, and four-bar linkage 32. First stage cylinder 28 is preferably a hydraulic or pneumatic actuator capable of providing a fluid motion. A controller 64 is operably coupled to first stage cylinder 28 to provide the necessary control signal during operation.

Still referring to FIGS. 4–7, a lower end 66 of second stage cylinder 30 is pivotably coupled to slide 62 at pivot 68. Slide 62 further carries four-bar linkage 32. Specifically, four-bar linkage 32 includes a generally elongated first linkage 70 that is pivotably coupled at one end to slide 62 at pivot 72 and pivotably coupled at an opposing end to a mounting bracket 74 at pivot 76. Mounting bracket 74 is fixedly coupled to an underside 78 of body panel 24. Furthermore, four-bar linkage 32 further includes a generally U-shaped second linkage 80 that is pivotably coupled at one end to slide 62 at pivot 82 and pivotably coupled at an opposing end to a mounting bracket 84 at pivot 86. Like mounting bracket 74, mounting bracket 84 is fixedly mounted to underside 78 of body panel 24. It should be appreciated to one skilled in the art that the specific configuration, dimensions, and shape of first linkage 70 and second linkage 80 are dependant upon the unique structure of automotive vehicle 12. Therefore, it is anticipated that variations in shape, configuration, and dimensions of first linkage 70 and second linkage 80 will occur in differing automotive vehicle.

Preferably, second stage cylinder 30 is either a pneumatic or hydraulic actuator which is controlled in response to a controller 88 to provide fluid motion through its operation. It is anticipated that a single controller may be used for all timing and actuation of the various components of the present invention. Second stage cylinder 30 is further pivotably coupled to first linkage 70 of four-bar linkage 32 at pivot 90. The specific location of pivot 90 along first linkage 70 provides the necessary mechanical advantage to actuate body panel 24.

Figure 5:
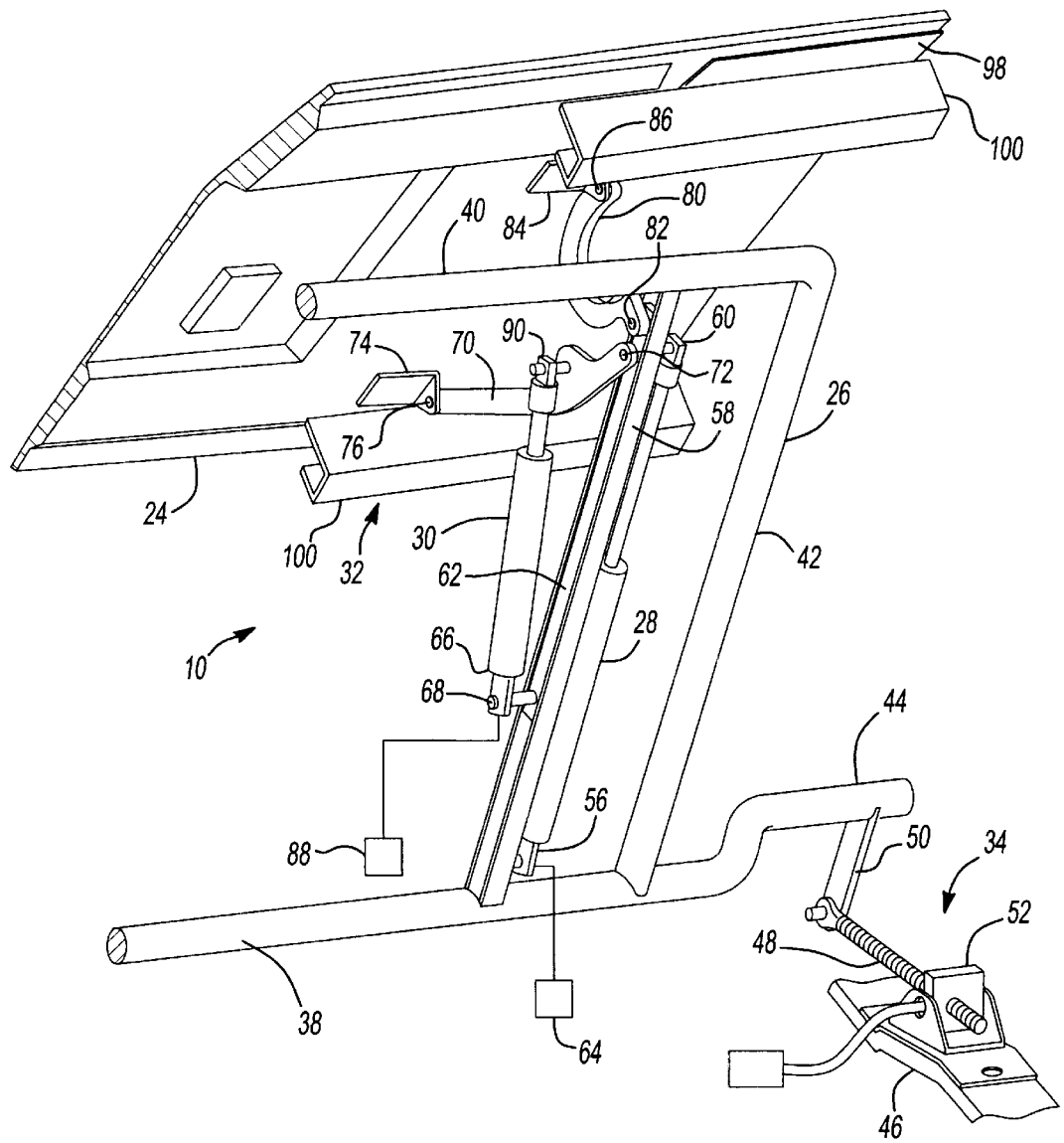
FIG. 5 is a partial perspective view illustrating the vehicle seat covering system in a first intermediate position with the remainder of the vehicle removed for clarity.
Figure 6:
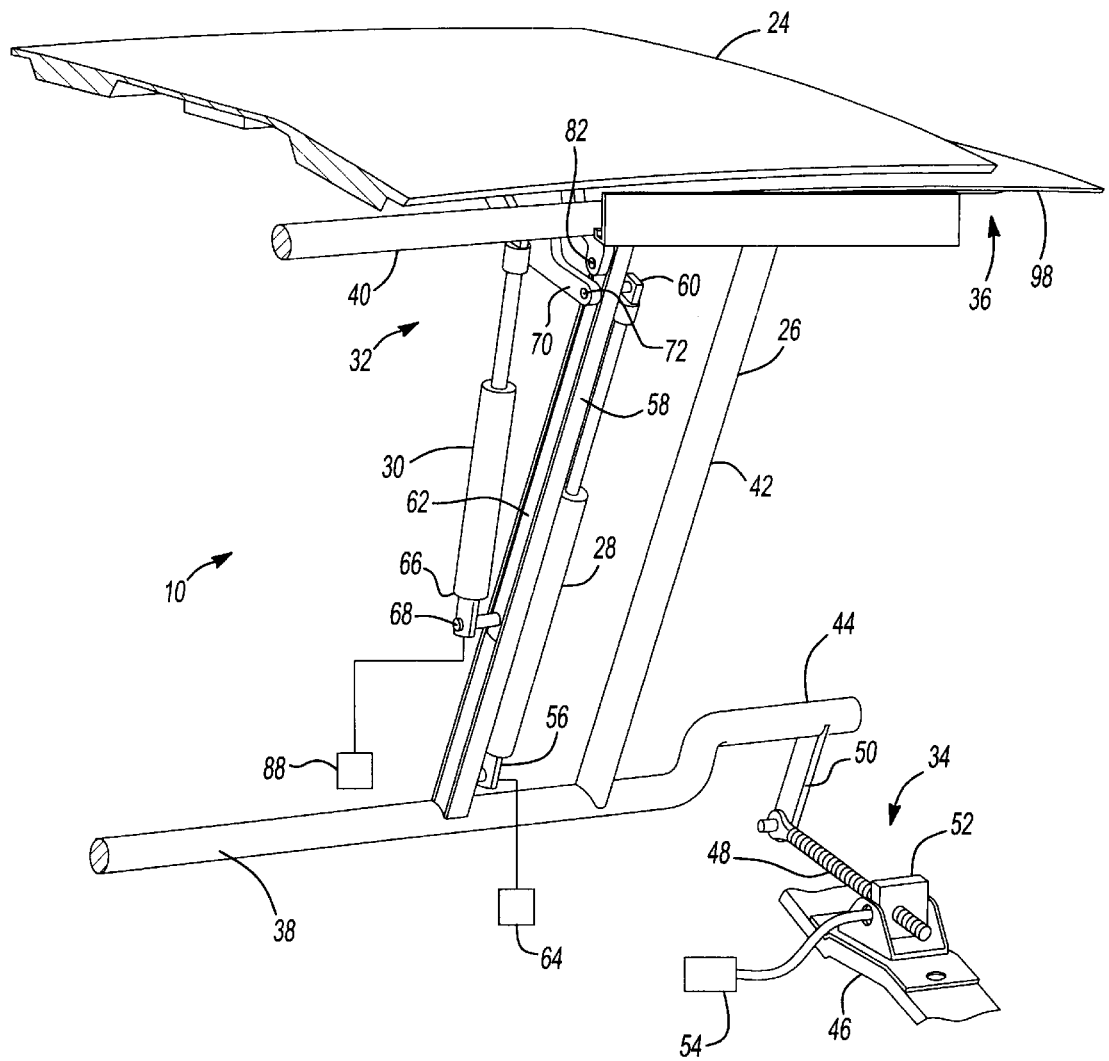
FIG. 6 is a partial perspective view illustrating the vehicle seat covering system in a second intermediate position with the remainder of the vehicle removed for clarity.
Figure 7:
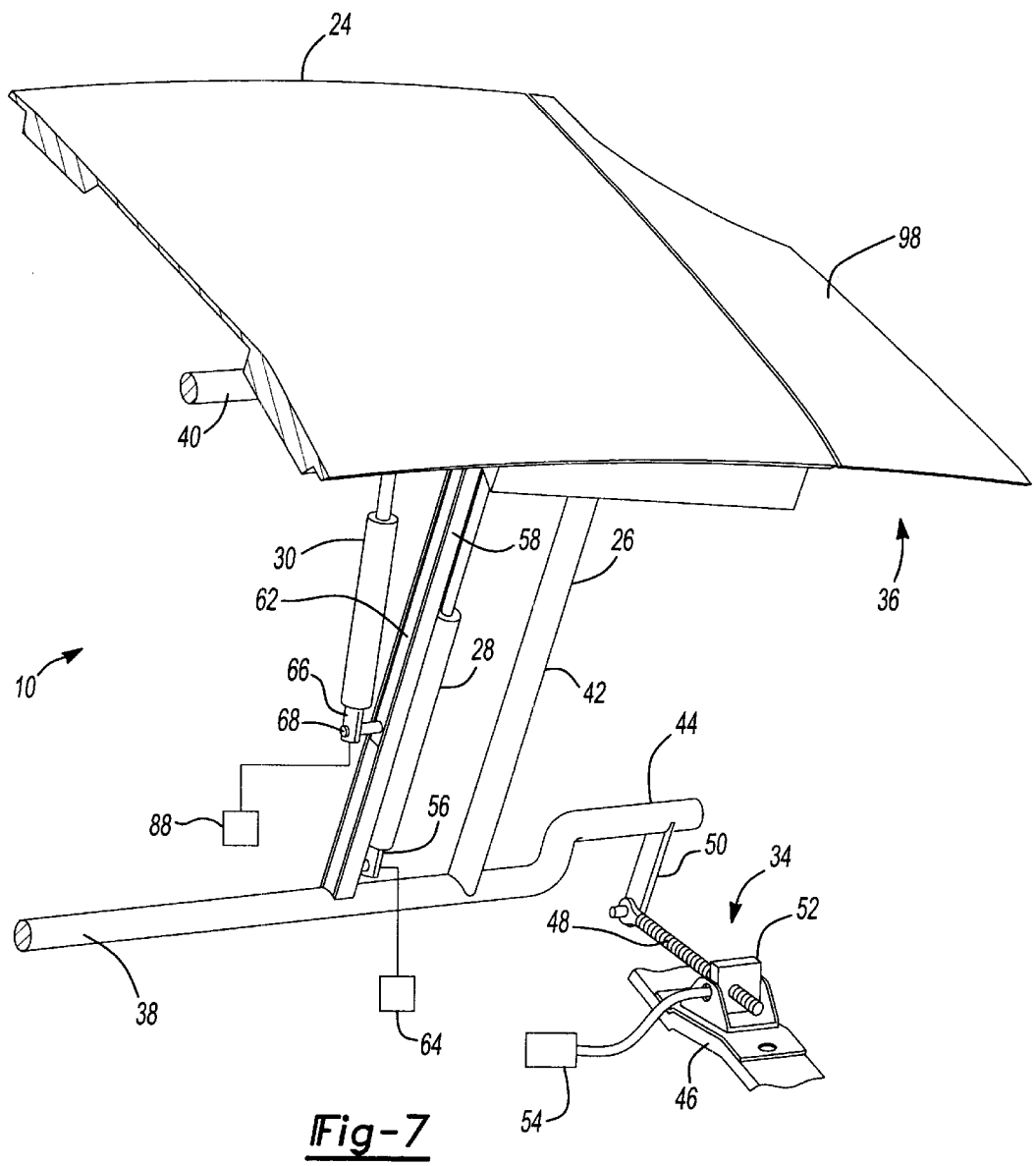
FIG. 7 is a partial perspective view illustrating the vehicle seat covering system in a fully raised position with the remainder of the vehicle removed for clarity.

As best seen in FIGS. 3–7, rear seat body panel assembly 10 is positionable between a fully retracted and stowed position (FIG. 3) and a fully raised position (FIG. 7). The actuation of the pair of outboard covering assemblies 36 will be described in detail below. Referring now to FIG. 3, rear seat body panel assembly 10 is shown in the fully retracted and stowed position. In this position, rear seat body panel assembly 10 is generally reclined to provide a comfortable seating surface 92. Specifically, seating surface 92 includes a bottom cushion 94 and a back cushion 96. This slightly reclined position provides a comfortable rear seat for additional passengers within automotive vehicle 12. However, according to the principles of the present invention, rear seat body panel assembly 10 is used to selectively cover this rear seat to provide a two-seat roadster-style vehicle. Specifically, drive motor 54 of drive mechanism 34 is actuated such that the inner rotating member of stationary coupling member 52 extends screw drive member 48 relative to mounting bracket 46. This movement exerts a rotating force on offset drive arm 44 of support frame 26. The offset orientation of offset drive arm 44 relative to the pivoting axis A—A causes support frame 26 to rotate in a generally clockwise direction (FIG. 3). This movement is preferable in order to position support frame 26, first stage cylinder 28, second stage cylinder 30, four-bar linkage 32, and body panel 24 in a generally vertical position to facilitate further deployment of body panel 24. However, this initial driving movement may not be necessary in all vehicle configurations.

Figure 4:
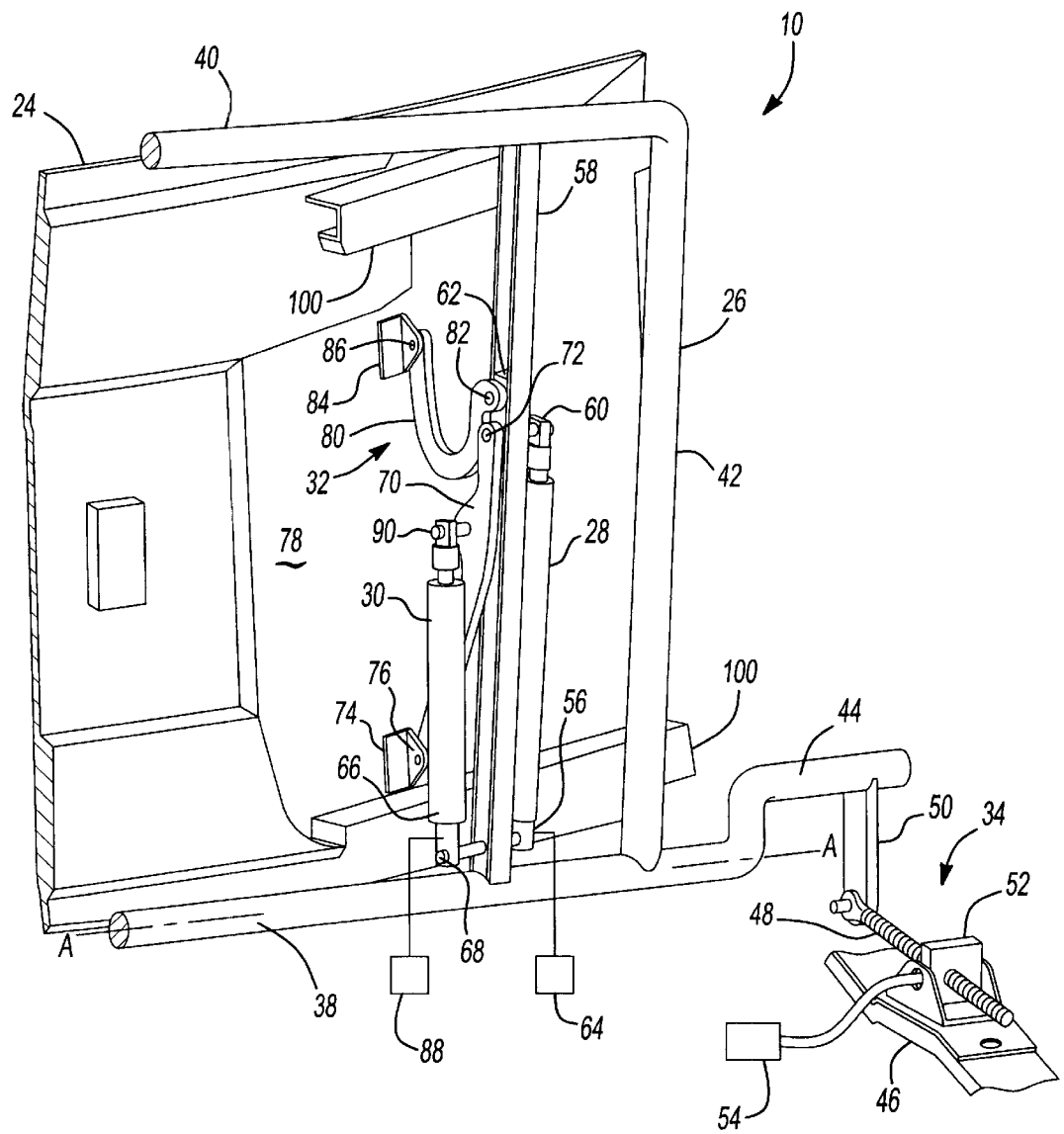
FIG. 4 is a partial perspective view illustrating the vehicle seat covering system in a fully retracted and stowed position with the remainder of the vehicle removed for clarity.

Controller 64 actuates first stage cylinder 28 such that first stage cylinder 28 extends and carries second stage cylinder 30, four-bar linkage 32, and body panel 24 generally vertically (see FIGS. 4–5). Controller 88 subsequently or simultaneously actuates second stage cylinder 30. Accordingly, second stage cylinder 30 exerts a driving force on first linkage 70 at pivot 90. This driving force causes first linkage 70 to rotate upward about pivot 72, thereby driving body panel 24 through pivot 76. As a result of the four-bar linkage configuration, second linkage 80 begins rotating about pivot 82 and pivot 86 (FIGS. 5–6). Second stage cylinder 30 will continue this driving movement until body panel 24 is in a fully raised position, wherein body panel 24 is generally disposed above the rear seat of the vehicle, thereby providing a two-seat roadster-style vehicle.

Still further, depending upon the styling of the vehicle, it may be necessary to actuate the pair of outboard covering panel assemblies 36. It should be appreciated by one skilled in the art, however, that the pair of outboard covering panel assemblies 36 are optional and, thus, are not required on every vehicle. Moreover, it should be appreciated that the pair of outboard covering panel assemblies 36 may also be used on panel members other than those specifically recited in the present embodiment. For example, the pair of outboard covering panel assemblies 36 may be used in conjunction with a tonneau cover, deck lid, trunk lid, or other covering panel in a vehicle. Due to the linear movement and stacked configuration of the pair of outboard covering panel assemblies of the present invention, numerous alternative embodiments are anticipated.

Figure 10:
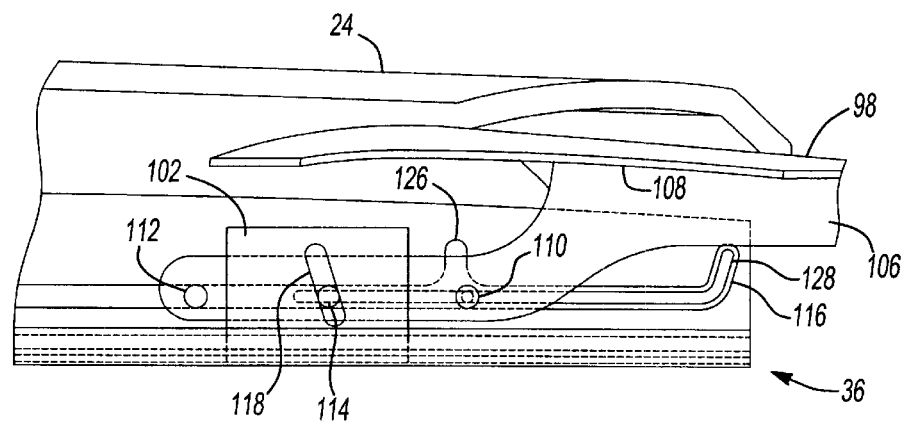
FIGS. 10–12 is a series of side views illustrating the extension motion of the supplemental body panel between a fully retracted position and a fully extended position.
Figure 11:
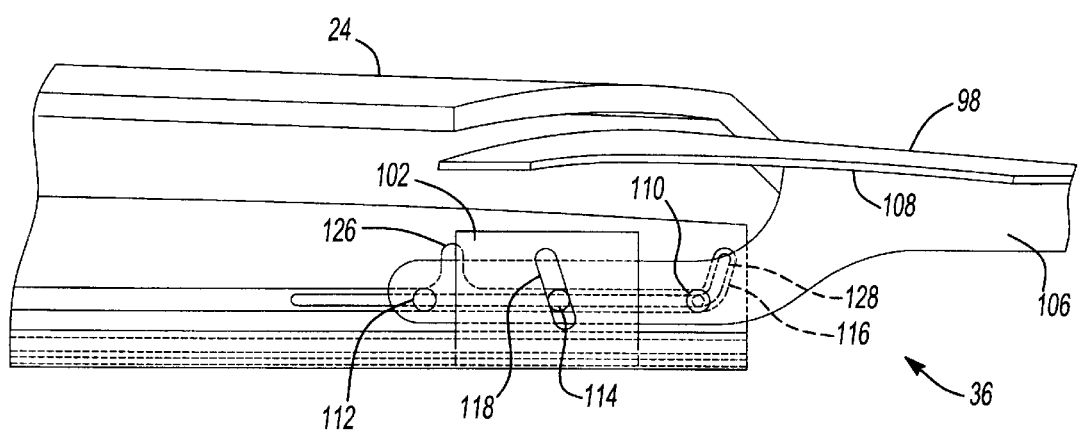
Figure 12:
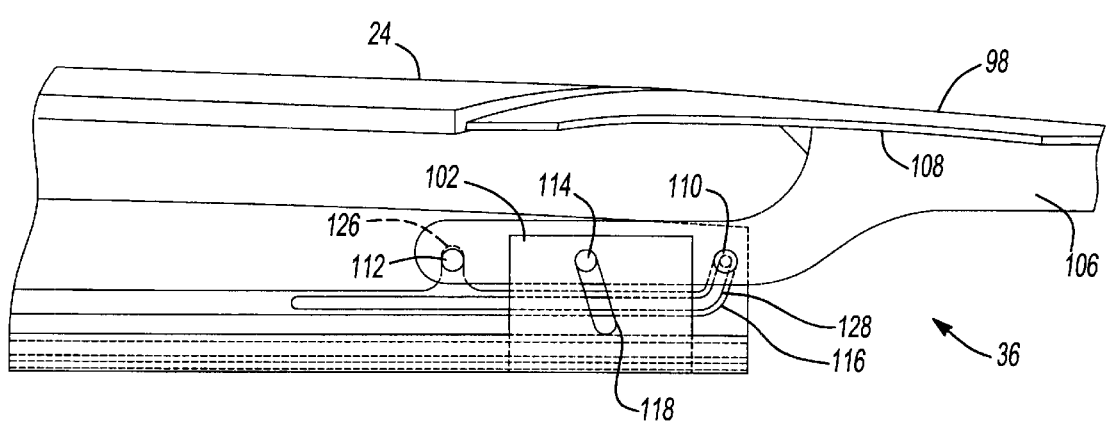

Each of the pair of outboard covering panel assemblies 36 include a supplemental body panel 98, a pair of guide tracks 100, a pair of guide blocks 102, and at least one drive motor 104. Supplemental body panel 98 includes a pair of panel support arms 106 extending from an underside 108 of supplemental body panel 98. As best seen in FIGS. 10–12, panel support arm 106 includes a outboard cam pin 110, a inboard cam pin 112, and an intermediate cam pin 114 extending therefrom. Outboard cam pin 110 and rearward pin 112 are sized to be slidably received within a camming slot 116 disposed in each guide track 100. Intermediate cam pin 114 of panel support arm 106 is sized to be slidably received within a camming slot 118 formed in guide block 102.

Guide blocks 102 are slidably disposed within a channel 120 formed in guide track 100. Guide track 100 further includes a cable channel 122 for receiving a drive cable 124 of drive motor 104. Drive cable 124 is capable of exerting a driving or retracting force on guide block 102 during actuation of supplemental body panel 98.

Figure 8:
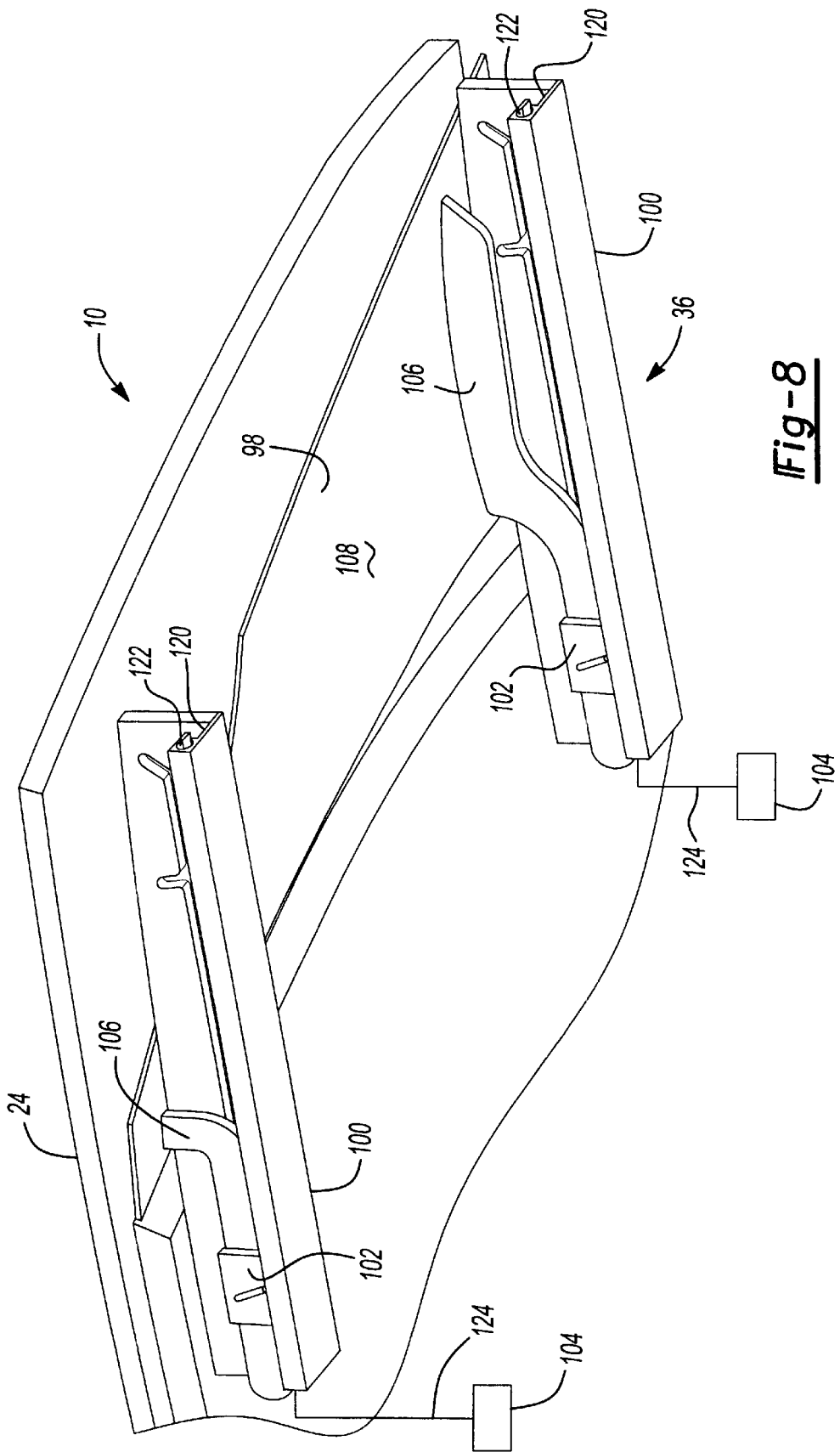
FIG. 8 is a partial perspective view illustrating the supplemental body panel of the vehicle seat covering system in a fully retracted position.
Figure 9:
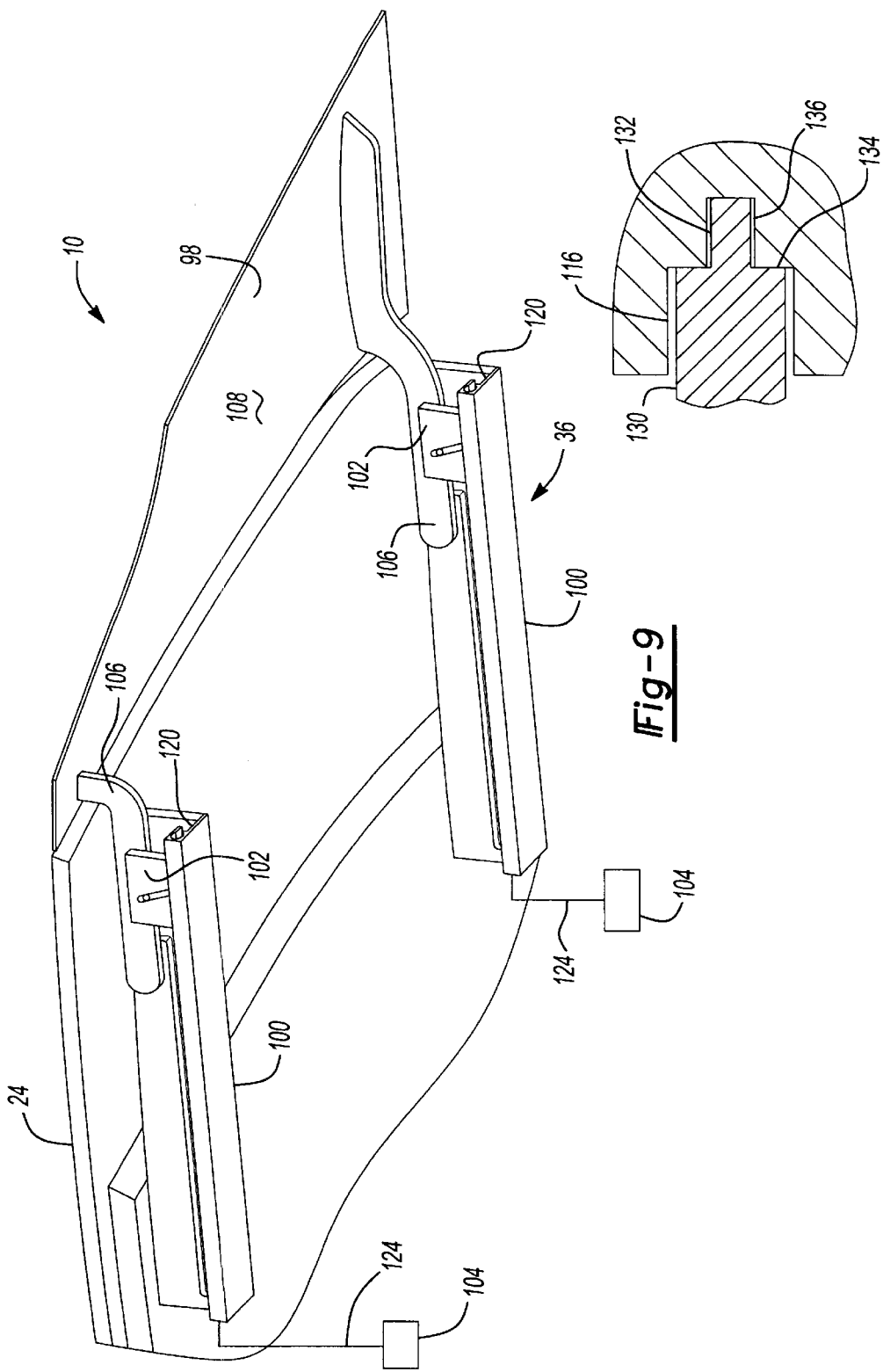
FIG. 9 is a partial perspective view illustrating the supplemental body panel of the vehicle seat covering system in a fully extended position.

Supplemental body panel 98 is positionable between a fully retracted position (FIGS. 8 and 10), and a fully extended position (FIGS. 9 and 12). Supplemental body panel 98 is extended by first actuating drive motor 104 such that drive cable 124 exerts a driving or pushing force on guide block 102. Guide block 102 serves to drive panel support arms 106 and supplemental body panel 98 outward as outboard cam pin 110 and inboard cam pin 112 ride within camming slot 116. It should be noted, however, that due to the decline orientation of camming slot 118 in guide block 102, the driving force exerted on panel support arms 106 includes a lifting force component. Therefore, it is necessary to prevent outboard cam pin 110 from entering an inboard anchor position 126 of camming slot 116. For proper extension of supplemental body panel 98, it is necessary that outboard cam pin 110 completely extend toward and into an outboard anchor position 128 (FIG. 10). To this end, as best seen in FIG. 13, outboard cam pin 110 includes a multi-diameter cross-section. In particular, outboard cam pin 110 includes an enlarged diameter portion 130 and a reduced diameter portion 132 interconnected by a shoulder portion 134. Likewise, camming slot 116 includes a similarly configured multi-diameter cross-section. Specifically, reduced diameter portion 132 of outboard cam pin 110 rides within a reduced diameter cam slot 136 formed in camming slot 116. Reduced diameter cam slot 136 and reduced diameter portion 132 of outboard cam pin 110 cooperate to prevent outboard cam pin 110 from entering inboard anchor position 126 while supplemental body panel 98 is driven outwardly.

Further actuation of drive motor 104 extends drive cable 124 and guide block 102 until outboard cam pin 110 cams up and into upward anchor position 128 (FIG. 11). In this position, further outboard movement of supplemental body panel 98 is prevented. However, drive motor 104 is still further actuated such that drive cable 124 drives guide block 102 outwardly. Because outboard cam pin 110 is prevented from further movement, movement of guide block 102 causes intermediate cam pin 114 to ride upwardly within camming slot 118 of guide block 102. Up to this point, this lifting motion has been restricted by outboard cam pin 110 and inboard cam pin 112 being disposed within camming slot 116. However, inboard cam pin 112 is now in a position generally below inboard anchor position 126 and thus may be lifted into and retained within inboard anchor position 126 (FIG. 12). Once outboard cam pin 110 is positioned and retained within outboard anchor position 128 and inboard cam pin 112 is positioned and retained within inboard anchor position 126, drive motor 104 may be turned off. At this point, supplemental body panel 98 has been positioned in a fully extended position. To retract supplemental body panel 98, the above method is simply reversed.

Rear seat body panel assembly 10, according to the principles of the present invention, provides an apparatus capable of quickly and conveniently converting a four-seat convertible into a two-seat roadster-style vehicle. This arrangement provides for a number distinct advantages over the prior art. By non-limiting example, the rear seat body panel assembly 10 of the present invention permits a vehicle to be designed and configured such that it can accommodate four passengers and luggage in a first mode and then quickly be converted into a sporty and stylish two-seat roadster configuration, thereby incorporating the fun and practicality of a conventional convertible and a conventional roadster.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle comprising:
   a passenger seat;
   a panel positionable in an extended position generally concealing the passenger seat and a stowed position generally revealing the passenger seat, the panel being generally vertical in the stowed position;
   an automatic actuation system operable to move the panel between the extended position and the stowed position; and a supplemental panel assembly movably coupled to the panel, the supplemental panel assembly being movable along a path generally transverse to a longitudinal axis of the automotive vehicle between an extended position and a retracted position.

2. The automotive vehicle according to claim 1 wherein the retracted position of the supplemental panel assembly is generally stacked relative to the panel.

3. The automotive vehicle according to claim 1 wherein the automatic actuation system comprises:
   a support frame;
   a slidable member coupled to the support frame;
   a four-bar linkage coupled between the slidable member and the panel;
   a first actuator coupled between the four-bar linkage and the slidable member, the first actuator operable to drive the four-bar linkage; and
   a second actuator coupled between the support frame and the slidable member, the second actuator operable to drive the slidable member.

4. The automotive vehicle according to claim 3, further comprising:
   a drive mechanism coupled to the support frame, the drive mechanism capable of pivoting the support frame.

5. The automotive vehicle according to claim 3, further comprising:
   a seating surface coupled to the support frame.

6. The automotive vehicle according to claim 1, further comprising:
   a retractable convertible roof being positionable between a retracted position and an extended position, the retractable convertible roof being separate and independent from the automatic actuation system.

7. The automotive vehicle according to claim 6 wherein the automatic actuation system is operable even when the retractable convertible roof is in the retracted position and the extended position.

8. The automotive vehicle according to claim 1 wherein the panel is substantially below a beltline of the automotive vehicle when the panel is in the stowed position.

9. An automotive vehicle comprising:
   a passenger seat;
   a panel positionable in an extended position generally concealing the passenger seat and a stowed position generally revealing the passenger seat, the panel being generally vertical in the stowed position;
   an automatic actuation system operable to move the panel between the extended position and the stowed position;
   a supplemental panel assembly operably coupled to the panel, the supplemental panel assembly being positionable in an extended position generally coplanar with the panel and a retracted position, the supplemental panel assembly comprising a supplemental panel having a support arm, the support arm having a pair of camming pins;
   a guide track supporting the support arm, the guide track having a cam slot sized to receive the pair of camming pins;
   a second automatic actuation system coupled to the supplemental panel, the second automatic actuation system being operable to move the supplemental panel between the extended position and the retracted position.

10. The automotive vehicle according to claim 9 wherein the second automatic actuation system comprises:
    a drive motor;
    a drive cable coupled to the drive motor for linear movement;
    a guide block coupled to the drive cable and the support arm, the guide block driving the support arm such that the pair of camming pins of a support arm cam within the cam slot of the guide track.

11. The automotive vehicle according to claim 10 wherein the guide block further comprises a guide slot sized to receive a guide cam pin extending from the support arm, the guide cam pin and the guide slot cooperating to lift the supplemental panel assembly into the extended position.

12. An automotive vehicle comprising:
    a front passenger seat;
    a rear passenger seat;
    a body panel positionable in an extended position generally concealing only the rear passenger seat and a stowed position generally revealing the rear passenger seat; and
    an automatic drive mechanism operable to drive the panel between the extended position and the stowed position, said automatic drive mechanism having a support frame, a slidable member mounted to said support frame, and a four-bar linkage coupled between the body panel and the support frame.

13. The automotive vehicle according to claim 12, further comprising:
    a retractable convertible roof being positionable between a retracted position and an extended position, the retractable convertible roof being separate and independent from the automatic drive mechanism.

14. The automotive vehicle according to claim 12 wherein the automatic drive mechanism further comprises:
    a first actuator coupled between the four-bar linkage and the slidable member, the first actuator operable to drive the four-bar linkage;
    a second actuator coupled between the support frame and the slidable member, the second actuator operable to drive the slidable member; and
    a pivoting mechanism coupled to the support frame, the pivoting mechanism capable of pivoting the support frame.

15. The automotive vehicle according to claim 12 wherein the body panel is substantially below a beltline of the automotive vehicle when the body panel is in the stowed position.

16. An automotive vehicle comprising:
    a rear passenger seat;
    a body panel positionable in an extended position generally concealing the rear passenger seat and a stowed position generally revealing the rear passenger seat;
    an automatic drive mechanism operable to drive the panel between the extended position and the stowed position;
    a linkage mechanism coupled between the body panel and the automatic drive mechanism;
    a supplemental panel operably coupled to the body panel, the supplemental panel being positionable in an extended position generally coplanar with the body panel and a retracted position generally stacked with the body panel, the supplemental panel having a support arm and a pair of camming pins extending from the support arm;
    a guide track mounted to the body panel, the guide track supporting the support arm, the guide track having a cam slot sized to receive the pair of camming pins; and an second automatic drive mechanism coupled to the supplemental panel, the second automatic drive mechanism being operable to move the supplemental panel between the extended position and the retracted position.

17. The automotive vehicle according to claim 16 wherein the second automatic drive mechanism comprises:
a drive motor;
a drive cable coupled to the drive motor for linear movement;
a guide block coupled to the drive cable and the support arm, the guide block driving the support arm such that the pair of camming pins of the support arm cam within the cam slot of the guide track.

18. The automotive vehicle according to claim 17 wherein the guide block further comprises a guide slot sized to receive a guide cam pin extending from the support arm, the guide cam pin and the guide slot cooperating to lift the supplemental panel into the extended position.

19. An automotive vehicle comprising:
a rear passenger seat;
a body panel positionable in an extended position generally concealing the rear passenger seat and a stowed position generally revealing the rear passenger seat; and
a supplemental panel slidably coupled to the body panel, the supplemental panel being linearly positionable along a path generally transverse to a longitudinal axis of the automotive vehicle in an extended position generally coplanar with the body panel and a retracted position.

20. The automotive vehicle according to claim 19, further comprising:
an automatic drive mechanism operable to drive the body panel between the extended position and the stowed position, the automatic drive mechanism having:
a support frame;
a slidable member disposed in the support frame;
a linkage assembly coupled between the slidable member and the panel;
a first actuator coupled between the linkage assembly and the slidable member, the first actuator operable to drive the linkage assembly;
a second actuator coupled between the support frame and the slidable member, the second actuator operable to drive the slidable member; and
a pivoting mechanism coupled to the support frame, the pivoting mechanism capable of pivoting the support frame.

21. The automotive vehicle according to claim 20, further comprising:
a retractable convertible roof being positionable between a retracted position and an extended position, the retractable convertible roof being separate and independent from the automatic drive mechanism, the automatic drive mechanism being operable even when the retractable convertible roof is in the retracted position and the extended position.

22. The automotive vehicle according to claim 19 wherein the body panel is substantially below a beltline of the automotive vehicle when the body panel is in the stowed position.

23. An automotive vehicle comprising:
a rear passenger seat;
a body panel positionable in an extended position generally concealing the rear passenger seat and a stowed position generally revealing the rear passenger seat;
a supplemental panel slidably coupled to the body panel, the supplemental panel being linearly positionable in an extended position generally coplanar with the body panel and a retracted position;
a support arm extending from the supplemental panel, said support arm having a pair of camming pins extending therefrom, the supplemental panel being generally stacked with the body panel in the retracted position;
a guide track mounted to the body panel, the guide track supporting the support arm, the guide track having a cam slot sized to receive the pair of camming pins; and
an second automatic drive mechanism coupled to the supplemental panel, the second automatic drive mechanism being operable to move the supplemental panel between the extended position and the retracted position.

24. The automotive vehicle according to claim 23 wherein the second automatic drive mechanism comprises:
a drive motor;
a drive cable coupled to the drive motor for linear movement;
a guide block coupled to the drive cable and the support arm, the guide block driving the support arm such that the pair of camming pins of the support arm cam within the cam slot of the guide track.

25. The automotive vehicle according to claim 24 wherein the guide block further comprises a guide slot sized to receive a guide cam pin extending from the support arm, the guide cam pin and the guide slot cooperating to lift the supplemental panel into the extended position.

26. An automotive vehicle comprising:
a convertible roof moveable between a raised position and a stowed position;
a roof storage compartment operably receiving the convertible roof when the convertible roof is in the stowed position;
a generally rigid panel moveable from a generally vertical retracted position to a generally horizontal exposed position generally forward of the roof storage compartment;
an elongated guide coupled to the panel to assist in movement of the panel;
a supplemental panel assembly operably coupled to the generally rigid panel, the supplemental panel assembly being positionable in an extended position generally coplanar with the generally rigid panel and a retracted position, the supplemental panel assembly comprises:
a supplemental panel having a support arm, the support arm having a pair of camming pins;
a guide track mounted to the generally rigid panel and supporting the support arm, the guide track having a cam slot sized to receive the pair of camming pins; and
an automatic actuation system coupled to the supplemental panel, the automatic actuation system being operable to move the supplemental panel assembly between the extended position and the retracted position.

27. The automotive vehicle according to claim 26 wherein the automatic actuation system comprises:
a drive motor;
a drive cable coupled to the drive motor for linear movement;
a guide block coupled to the drive cable and the support arm, the guide block driving the support arm such that the pair of camming pins of the support arm cam within the cam slot of the guide track.

28. The automotive vehicle according to claim 27 wherein the guide block further comprises a guide slot sized to receive a guide cam pin extending from the support arm, the guide cam pin and the guide slot cooperating to lift the supplemental panel assembly into the extended position.

29. The automotive vehicle according to claim 26 wherein the retracted position of the supplemental panel assembly is generally stacked relative to the generally rigid panel.

30. An automotive vehicle comprising:
   a convertible roof moveable between a raised position and a stowed position;
   a roof storage compartment operably receiving the convertible roof when the convertible roof is in the stowed position;
   a generally rigid panel moveable from a generally vertical retracted position to a generally horizontal exposed position generally forward of the roof storage compartment;
   an elongated guide coupled to the panel to assist in movement of the panel;
   a support frame operably supporting the generally rigid panel;
   the elongated guide coupled to the support frame;
   a slide member slidably coupled to the elongated guide;
   a four-bar linkage coupled between the slide member and the generally rigid panel;
   a first actuator coupled between the four-bar linkage and the slide member, the first actuator operable to drive the four-bar linkage; and
   a second actuator coupled between the support frame and the slide member, the second actuator operable to drive the slide member.

31. The automotive vehicle according to claim 30, further comprising:
   a drive mechanism coupled to the support frame, the drive mechanism capable of pivoting the support frame.

32. The automotive vehicle according to claim 30 wherein the generally rigid panel is substantially below a beltline of the automotive vehicle when the generally rigid panel is in the retracted position.

33. The automotive vehicle according to claim 30 wherein the convertible roof is a soft top convertible roof.

34. The automotive vehicle according to claim 30, further comprising:
   a trunk lid operable to selectively conceal the roof storage compartment.

35. An automotive vehicle comprising:
   a trunk;
   a front seat;
   an area disposed between said trunk and said front seat;
   a panel positionable in an extended position generally concealing the area and simultaneously revealing the front seat and a stowed position generally revealing the area, the panel being generally vertical in the stowed position; and
   an automatic actuation system having a four-bar linkage coupled between a support frame and said panel, said automatic actuation system being operable to move the panel between the extended position and the stowed position.

36. The automotive vehicle according to claim 35, further comprising:
   a supplemental panel assembly operably coupled to the panel, the supplemental panel assembly being positionable in an extended position generally coplanar with the panel and a retracted position.

37. An automotive vehicle comprising:
   a seat having a back cushion;
   a body panel positionable in an extended position generally covering the seat and a stowed position generally revealing the seat;
   an actuation system operable to move the body panel between the extended position and the stowed position,
   wherein the back cushion is coupled to at least one of the group consisting of the body panel and the actuation system for movement therewith.

* * * * *

UNITED STATES PATENT AND TRADEMARK OFFICE
CERTIFICATE OF CORRECTION

PATENT NO.      : 6,595,522 B2                                            Page 1 of 1
DATED           : July 22, 2003
INVENTOR(S)     : Bernard W. Schaller, Todd Grubbs and George A. Corder It is certified that error appears in the above-identified patent and that said Letters Patent is hereby corrected as shown below:

Column 3,
Line 40, "38 50" should be -- 38 so --.

Column 4,
Line 33, "vehicle" should be -- vehicles --.

Column 5,
Line 43, "a" (both occurrences) should be -- an --.

Column 6,
Line 45, after "number" insert -- of --.

Column 9,
Line 1, "an" should be -- a --.

Column 10,
Line 12, "an" should be -- a --.

Signed and Sealed this

Third Day of February, 2004

JON W. DUDAS
*Acting Director of the United States Patent and Trademark Office*